United States Patent

Weigl

[15] 3,649,117
[45] Mar. 14, 1972

[54] IMAGING PROCESS

[72] Inventor: John W. Weigl, West Webster, N.Y.

[73] Assignee: Xerox Corporation, Rochester, N.Y.

[22] Filed: Jan. 2, 1970

[21] Appl. No.: 92

[52] U.S. Cl. .................................. 355/17, 96/1 E, 355/3, 355/12
[51] Int. Cl. ........................................ G03g 13/00
[58] Field of Search ................. 355/3, 12, 17, 11; 96/1 R, 96/1 E, 13

[56] References Cited

UNITED STATES PATENTS 3,512,968  5/1970  Tulagin ............................. 96/1.3 X
3,094,910  6/1963  Wagner et al. ..................... 96/1.5 X Primary Examiner—Samuel S. Matthews
Assistant Examiner—Richard L. Moses
Attorney—James J. Ralabate, David C. Petre and Raymond C. Loyer

[57] ABSTRACT

A contact reflex manifold imaging process is provided wherein a manifold set comprising an electrically photosensitive imaging layer in a screen pattern releasably resides on a transparent donor sheet and is in contact with a transparent receiver sheet. A master to be copied is placed in contact with one side of the manifold set and is exposed to electromagnetic radiation to which the imaging layer is sensitive by passing the electromagnetic radiation through the manifold set while the imaging layer is subjected to an electric field. Upon separation of the manifold set while under a field and after the exposure, a positive image is observed on one of the donor and receiver sheets and a negative image is observed on the other sheet.

11 Claims, 4 Drawing Figures

Patented March 14, 1972 3,649,117

INVENTOR.
JOHN W. WEIGL

BY

ATTORNEY

IMAGING PROCESS

BACKGROUND OF THE INVENTION

This invention relates to the manifold imaging process and more particularly to the use of contact reflex imaging in conjunction with the manifold imaging process.

Photosensitive image reproducing systems commonly use expensive and bulky optical lens exposure systems for focusing a light pattern on the photosensitive surface. In making a size-to-size reproduction of a transparency, the optical lens is avoided by placing the transparency directly in contact with the photosensitive surface and shining light through the transparency. Unfortunately, the direct light system will not work when the original is opaque.

Previously, it has not been possible to utilize the manifold imaging process with reflex-type exposure. The conventional manifold imaging process is fully described in copending applications, Ser. No. 708,380 now U.S. Pat. No. 3,473,175 filed Feb. 26, 1968. It was generally believed that the manifold imaging layers would not respond to imagewise transfer from a donor sheet to a receiver sheet upon illumination of sufficient intensity to penetrate the imaging layer irrespective of any additional radiation reflected back to the imaging layer from any image surface as in a reflex system. However, a reflex system has many advantages over other reproduction methods. Two of the main reasons are the savings possible in terms of money and space. In a reflex system, a lens system is not necessary. Lenses of good optical quality are expensive. Their elimination is an appreciable savings. Further, placing a copy in contact with the manifold set rather than at a distance determined by the focal length of a lens system, makes possible substantial reductions in space requirements with consequent increased flexibility of design.

There has now been discovered a novel imaging process which now makes possible reflex copying in a manifold imaging imaging system.

SUMMARY OF THE INVENTION

Therefore, it is an object of this invention to define a method of reflex exposure in a manifold imaging system.

A further object of this invention is to define means for imaging an original positioned in closely spaced relationship to the manifold set.

Another object of this invention is to provide a manifold imaging process which avoids the necessity of employing optical focusing of the image pattern by means of a lens system.

These and other objects of this invention will become apparent upon reading the following description of the invention.

There has now been discovered a contact reflex manifold imaging process utilizing a manifold set comprising an electrically photosensitive imaging layer releasably residing in a screen pattern upon a transparent donor sheet and which is in contact with a transparent receiver sheet. The manifold set is placed in contact with a master to be duplicated and while the imaging layer is subjected to an electric field the master is flood illuminated by passing light through the manifold set. Light reflected back from the master in nonimage areas exposes the imaging layer on the side opposite the light source. As will be more fully explained below, the imaging layer is thus exposed from both directions in those areas overlying nonimage areas of the master while those areas of the imaging layer overlying the image portions of the master are illuminated from one direction only. Upon separation of the manifold set while under the influence of a field, an imagewise pattern is found on each of the donor and receiver sheets, one of which will be a negative image and the other of which will be a positive of the original master.

BRIEF DESCRIPTION OF THE DRAWINGS

The advantages of this improved method of imaging will become apparent upon consideration of the detailed disclosure of the invention, especially when taken in conjunction with the accompanying drawings wherein.

DETAILED DESCRIPTION OF THE DRAWINGS

Figure 1:
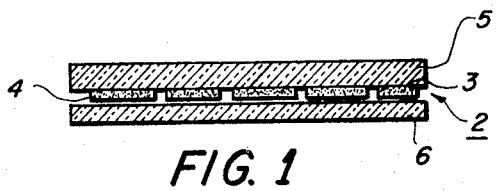
FIG. 1 is a side sectional view of a manifold sandwich for use in this invention.

Referring now to FIG. 1, imaging layer 2 comprising electrically photosensitive material 3 dispersed in binder 4 is releasably residing on the surface of donor sheet 5. Receiver sheet 6 is in contact with imaging layer 2 to complete the manifold set.

The imaging layer 2 serves as the photoresponsive element of the system as well as the colorant for the final image produced. Other colorants such as dyes and pigments may be added to the imaging layer so as to intensify or modify the color of the final image produced when color is important. Preferably, the imaging layer is selected so as to have a high level of response while at the same time being intensely colored so that a high contrast image can be formed. The imaging layer may be homogeneous comprising, for example, a solid solution of two or more pigments. The imaging layer may also be heterogeneous comprising, for example, pigment particles dispersed in a binder as illustrated in FIG. 1. The thickness of the imaging layer, whether homogeneous or heterogeneous, ranges from about 0.2 micron to about 10 microns, generally about 0.5 micron to about 5 microns and preferably about 2 microns. The ratio of photosensitive pigment to binder, by weight, in the heterogeneous system may range from about 10 to 1 to about 1 to 10 respectively, but it has generally been found that ratios in the range of from about 1 to 4 to about 2 to 1 respectively produce the best results and, accordingly, this constitutes a preferred range.

As shown in the attached drawings, imaging layer 2 is residing on donor sheet 5 in a screen pattern. The space between the portions of the imaging layer is large enough to permit light to pass but small enough to avoid a large reduction in image density. Normally from about 75 to about 95 percent of the total donor surface area is covered by the imaging layer while the corresponding area is clear. Preferably the imaging layer covers from about 80 to about 90 percent of the donor sheet surface area, and, more specifically, 85 percent coverage is considered optimum.

The binder material in the heterogeneous imaging layer or the material used in conjunction with the electrically photosensitive materials in the homogeneous layer, where applicable, may comprise any suitable cohesively weak insulating material or materials which can be rendered cohesively weak. Typical materials include: Microcrystalline waxes such as: Sunoco 1290, Sunoco 5825, Sunoco 985, all available from Sun Oil Co.; Paraflint RG, available from the Moore and Munger Company; paraffin waxes such as: Sunoco 5512, Sunoco 3425, available from Sun Oil Co.; Sohio Parowax, available from Standard Oil of Ohio; waxes made from hydrogenated oils such as: Capitol City 1380 wax, available from Capitol City Products, Co. Columbus, Ohio; Caster Wax L-2790, available from Baker Castor Oil Co.; Vitikote L-304, available from Duro Commodities; polyethylenes such as: Eastman Epolene N-11, Eastman Epolene C-12, available from Eastman Chemical Products, Co.; Polyethylene DYJT, Polyethylene DYLT, Polyethylene DYDT, all available from Union Carbide Corp.; Marlex TR 822, Marlex 1478, available from Phillips Petroleum Co.; Epolene C-13, Epolene C-10, available from Eastman Chemical Products, Co.; Polyethylene AC8, Polyethylene AC612, Polyethylene AC324, available from Allied Chemicals; modified styrenes such as: Piccotex 75, Piccotex 100, Piccotex 120, available from Pennsylvania Industrial Chemical; Vinylacetate-ethylene copolymers such as: Elvax Resin 210, Elvax Resin 310, Elvax Resin 420, available from E. I. duPont de Nemours & Co., Inc., Vistanex MH, Vistanex L–80, available from Enjay Chemical Co.; vinyl chloride-vinyl acetate copolymers such as: Vinylite VYLF, available from Union Carbide Corp.; styrene-vinyl toluene copolymers; polypropylenes; and mixtures thereof. The use of an insulating binder is preferred because it allows the use of a larger range of electrical field strength.

A mixture of microcrystalline wax and polyethylene is preferred because it is cohesively weak and an insulator.

Normally the imaging layer of this invention is coated onto a sheet referred to above as the donor sheet or substrate. For convenience, the combination of imaging layer and donor sheet is referred to as the donor. When employing a binder, the electrically photosensitive material can be mixed in the binder material by conventional means for blending solids such as ball milling. After blending the ingredients of the imaging layer, the desired amount is coated on a substrate in a dot pattern. The screen pattern can be formed by conventional means such as by printing or coating the imaging material on a donor sheet by means of a gravure roller or coated through a dot pattern stencil onto the substrate. In a particularly preferred method for providing a screen pattern imaging layer, a conventional manifold imaging layer comprising the electrically photosensitive material dispersed in a binder is coated onto a transparent electrically insulating donor sheet and is imaged under the conventional manifold process conditions with a screen pattern stencil. Upon separation of the manifold set, a screen pattern is found on one of the donor and receiver layers while the dot pattern resides on the other layer.

The imaging layer may be supplied in any color desired, either by taking advantage of the natural color of the photosensitive material or binder materials in the imaging layer or by the use of additional dyes and pigments therein whether photoresponsive or not and, of course, various combinations of these photosensitive and non-photosensitive colorants may be used in the imaging layer so as to produce the desired color.

Donor sheet 5 and receiver sheet 6 may comprise any suitable electrically insulating or electrically conducting material. Electrically insulating materials are preferred since they allow the use of high strength polymeric material. In addition, the donor sheet and the receiver sheet are at least partially transparent to the electromagnetic radiation to which the imaging layer is sensitive because in accordance with the process of this invention the electromagnetic radiation passes through the manifold set to the master to be copied and is reflected back through one of the donor or receiver sheets to the imaging layer sandwiched therebetween. Typical insulating materials include extruded or cast films of polypropylene, polycarbonates, polystyrene, polyethylene terephthalate, and other polyesters, cellulose acetate, paper, plastic coated paper, such as polyethylene coated paper, vinyl chloride-vinylidene chloride copolymers and mixtures thereof. Mylar (a polyester formed by the condensation reaction between ethylene glycol and terephthalic acid available from E. I. duPont de Nemours & Co., Inc.) is preferred because of its durability and excellent insulative properties. Not only does the use of this type of high strength polymer provide a strong substrate for the positive and negative images formed on the donor substrate and receiver sheet but, in addition, it provides an electrical barrier between the electrodes and the imaging layer which tends to inhibit electrical breakdown of the system while subjecting the manifold sandwich to an electric field. The donor sheet and receiver sheet may each be selected from different materials. Thus, a manifold sandwich can be prepared by employing an insulating donor sheet while a conductive material is employed as a receiver sheet.

Particularly preferred materials useful as donor and receiver sheets are those having coated on one side thereof a transparent conductive coating. Such materials as thinly metallized plastic substrates such as aluminized Mylar are particularly preferred since they eliminate the need for the presence of a transparent electrode. In addition, conductively coated transparent materials are preferred because the electric field can be placed across the manifold set without the necessity of including the master to be duplicated within the electric field which is the case when separate electrodes are employed.

As illustrated in FIG. 1, imaging layer 2 contains any suitable electrically photosensitive material 3. Typical suitable organic materials include quinacridones such as: 2,9-dimethyl quinacridone, 4,11-dimethyl quinacridone, 2,10-dichloro-6,13-dihydro-quinacridone, 2,9-dimethoxy-6,13-dihydro-quinacridone, 2,4,9,11-tetrachloro-quinacridone, and solid solutions of quinacridones and other compositions as described in U.S. Pat. No. 3,160,510; carboxamides such as: N-2''-pyridyl-8,13-dioxdinaphtho-(2,1-2',3')-furan-6-carboxamide, N-2''-(1'',3'',5''-dioxodinaphtho-(2,1-2',3')-furan-6-carboxamide, anthra-(2,1)-napththo-(2,3-d)-furan-9,14-dione-7-(2'-methyl-phenyl) carboxamide; carboxanilides such as: 8,13-dioxodinaphtho-(2,1-2', 3')-furan-6-carbox-p-methoxy-anilide, 8,13-dioxodinaphtho-(2,1-2',3') furan-6-carbox-p-methylanilide, 8,13-dioxodinaphtho-(2,1-2',3')-furan-6-carbox-m-chloranilide, 8,13-dioxodinaphtho-(2,1-2',3') furan-6-carbox-p-cyanoanilide; triazines such as: 2,4-diamino-triazine, 2,4-di (1'-anthraquinonyl-amino)-6-(1''-pyrenyl)-triazine, 2,4-di(1' anthraquinonyl-amino)-6-(1''-naphthyl)-triazine, 2,4-di (1'-naphthyl-amino)-6-(1'-perylenyl)-triazine, 2,4,6-tri (1',1'', 1'''-pyrenyl)-triazine; benzopyrrocolines such as: 2,3-phthaloyl-7,8-benzopyrrocoline, 1-cyano-2,3-phthaloyl-7, 8-benzopyrrocoline, 1-cyano-2,3-phthaloyl-5-acetamido-7,8-benzopyrrocoline; anthraquinones such as: 1,5-bis-(beta-phenylethyl-amino) anthraquinone, 1,5-bis-(3'-methoxypropylamino) anthraquinone, 1,5-bis(benzyamino) anthraquinone, 1,5-bis (phenyl-amino) anthraquinone, 1,2,5,6-di-(c,c'-diphenyl)-thiazole-anthraquinone, 4-(2'-hydroxyphenylmethoxyamino) anthraquinone; azo compounds such as: 2,4,6-tris (N-ethyl-N-hydroxy-ethyl-p-aminophenylazo) phloroglucinol, 1,3,5,7-tetrahydroxy-2,4,6,8-tetra (N-methyl-N-hydroxyethyl-p-amino-phenylazo) naphthalene, 1,3,5-trihydroxy-2,4,6-tris (3'-nitro-N-methyl-N-hydroxymethyl-4'-aminophenylazo) benzene, 3' methyl-1-phenyl-4-(3'pyrenylazo)-2-pyrazolin-5-one, 1-(3'pyrenylazo)-2-hydroxy-3-naphthanilide, 1-(3'-pyrenylazo)-2-naphthol, 1-(3'-pyrenylazo)-2-hydroxy-3-methylxanthene, 2,4,6-tris (3'-pyrenylazo) phloroglucinol, 2,4,6-tris (1'-phenanthrenylazo) phloroglucinol, 1-(2'-methoxy-5'-nitro-phenylazo)-2-hydroxy-3'-nitro-3-naphthanilide; dioxazines such as: 2,9-dibenzoyl-6,13-dichloro-triphenodioxazine, 2,9-diacetyl-6,13-dichloro-triphenodioxazine, 3,10-dibenzopylamino-2,9-diisopyropoxy-6,13-dichloro-triphenodioxazine, 2,9-difuroyl-6,13-dichloro-triphenodioxazine; lakes of fluorescein dyes, such as: lead lake of 2,7 -dinitro-4,5- dibromo fluorescein, lead lake of 2,4,5,7-tetrabromo fluorescein, aluminum lake of 2,4,5,7-tetrabromo-10,11,12,13-tetrachloro fluorescein; bisazo compositions such as: N,N'-di'[1-('-naphthylazo)-2-hydroxy-8-naphthyl] adipdiamide, N,N'-di-1-(1'-naphthylazo)-2-hydroxy 8-naphthyl succinidamide, bis-4, 4'-(2''-hydroxy-8''-N,N'-diterephthalamide-l-naphthylazo) biphenyl, 3,3'-methoxy-4,4'-diphenyl-bis ( 1''-azo-2''-hydroxy-3''naphthanilide); pyrenes such as: 1,3,6,8-tetraaminopyrene, 1-cyano-6-nitropyrene; phthalocyanines such as: beta-form metal free phthalocyanine, copper phthalocyanine, tetrachloro phthalocyanine, the x-form of metal-free-phthalocyanine as described in U.S. Pat. No. 3,357,989; metal salts and lakes of azo dyes, such as: calcium lake of 6-bromo-1 (1'-sulfo-2-naphthylazo)-2-naphthol, barium salt of 6-cyano-1(1'-sulfo-2-naphthylazo)-2-naphthol, calcium lake of 1-(2'-azonaphthaline-1'-sulfonic acid)-2-naphthol, calcium lake of 1-(4'-ethyl-5'-chlorobenzene-2'-sulfonic acid)-2-hydroxy-3-naphthoic acid; and mixtures thereof.

Typical inorganic compositions include cadmium sulfide, cadmium sulfoselenide, zinc oxide, zinc sulfide, sulphur selenium, mercuric sulfide, lead oxide, lead sulfide, cadmium selenide, titanium dioxide, indium trioxide and the like.

Other organic materials including organic donor-acceptor (Lewis Acid-Lewis Base) charge transfer complexes are listed in copending application, Ser. No. 708,380 now U.S. Pat. No. 3,473,175 filed Feb. 26, 1968, which is incorporated herein by reference.

In addition to the charge transfer complexes, it is to be noted that many other of the above materials may be further sensitized by the charge transfer complexing technique and that many of these materials may be dye-sensitized to narrow, broaden or heighten their spectral response curves.

It is also to be understood that the electrically photosensitive particles themselves may consist of any suitable one or more of the aforementioned electrically photosensitive materials, either organic or inorganic, dispersed in, in solid solution in, or copolymerized with, any suitable insulating resin whether or not the resin itself is photosensitive. This particular type of particle may be particularly desirable to facilitate dispersion of the particle, to prevent undesirable reactions between the binder and the photosensitive material or between the photosensitive and the activator and for similar purposes. Typical resins of this type include polyethylene, polypropylene, polyamides, polymethacrylates, polyacrylates, polyvinyl chlorides, polyvinyl acetates, polystyrene, polysiloxanes, chlorinated rubbers polyacrylonitrile, epoxies, phenolics, hydrocarbon resins and other natural resins such as rosin derivatives as well as mixtures and copolymers thereof.

The $x$-form phthalocyanine is preferred because of its excellent photosensitivity although any suitable phthalocyanine may be used to prepare the imaging layer of this invention. The phthalocyanine used may be in any suitable crystal form. It may be substituted or unsubstituted both in the ring and straight chain portions. Reference is made to a book entitled "Phthalocyanine Compounds" by F. H. Moser and A. L. Thomas, published by the Reinhold Publishing Company, 1963 edition for a detailed description of phthalocyanines and their synthesis.

Figure 2:
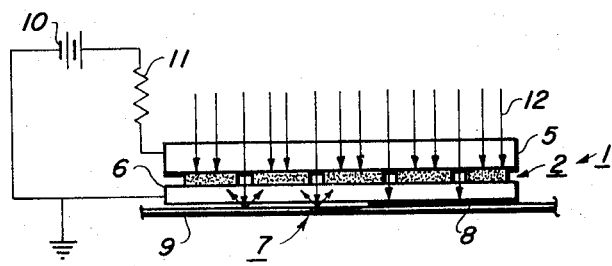
FIG. 2 is a side sectional view diagrammatically illustrating the exposure step of the process of this invention.

Referring now to FIG. 2, there is diagrammatically shown the process step of exposing to electromagnetic radiation the master to be duplicated in accordance with the process of this invention. In FIG. 2 there is shown manifold set 1, comprising donor sheet 5, imaging layer 2 and receiver sheet 6 resting upon the master to be duplicated 7. The master contains printed area 8 and unprinted area 9. In this case, both donor sheet 5 and receiver sheet 6 contain a thin transparent coating of electrically conductive material such that they function in a dual capacity in the process of this invention. That is, in addition to their function as donor and receiver sheets they also are employed as the electrodes across which a potential is applied from power source 10 through resistor 11. The electrical field can be applied in many ways. Generally, the manifold set is placed between electrodes having different electrical potential. Also, in the case wherein the donor and receiver sheets are electrically insulating, an electrical charge can be imposed upon one or both of the donor and receiver sheets before or after forming the manifold set by any one of several known methods for applying a static electrical charge into dielectric material. Static charges can be imposed by contacting the sheet or substrate with an electrically charged electrode. Alternatively, one or both sheets may be charged by using corona discharge devices such as those described in U.S. Pat. No. 2,588,699 to Carlson, U.S. Pat. No. 2,777,957 to Walkup, U.S. Pat. No. 2,885,556 to Gundlach or by using conductive rollers as described in U.S. Pat. No. 2,980,834 to Tregay et al. or by frictional means as described in U.S. Pat. No. 2,297,691 to Carlson or other suitable apparatus.

The strength of the electrical field applied across the manifold sandwich depends on the structure of the manifold sandwich and the materials used. For example, if highly insulating receiver and donor substrate materials are used, a much higher field may be applied than if relatively conductive donor and receiver sheets are used. The field strength required may, however, be easily determined. If too large a potential is applied, electrical breakdown of the manifold sandwich will occur allowing arcing between the electrodes. If too little potential is applied, the imaging layer will not transfer in imagewise configuration. By way of example, if a 3 mil Mylar receiver sheet and a 2 mil Mylar donor sheet are used, potentials as high as 20,000 volts may be applied between the electrodes. The preferred field strengths across the manifold sandwich are, however, in the range of from about 2,000 volts per mil to about 7,000 volts per mil of electrically insulating material. Since relatively high potentials are utilized, it is desirable to insert a resistor in the circuit to limit the flow of current. Resistors on the order of from about 1 megohm to about 20,000 megohms are conventionally used.

As shown in FIG. 2, electromagnetic radiation 12 passes through donor sheet 5 and strikes imaging layer 2 and passes between the dots through receiver sheet 6 to strike the master to be duplicated 7. In the nonimage areas 9 of master 7, a large amount of the electromagnetic radiation striking the master is reflected back through receiver sheet 6 to imaging layer 2, thus exposing those portions of the imaging layer from both directions. In the image areas 8 of master 7, the electromagnetic radiation is absorbed and very little or none is reflected back to imaging layer 2, thus leaving those of imaging layer 2 exposed from only one side.

A visible light source, an ultraviolet light source or any other suitable source of electromagnetic radiation may be used to expose the imaging layer of this invention. The electrically photosensitive material is chosen so as to be responsive to the wavelength of the electromagnetic radiation used. It is to be noted that different electrically photosensitive materials have different spectral responses and that the spectral response of many electrically photosensitive materials may be modified by dye sensitization so as to broaden the spectral response of a material. In addition, the electromagnetic radiation is chosen so as to be efficiently reflected by the unprinted surface or white space of the master to be duplicated.

Figure 3:
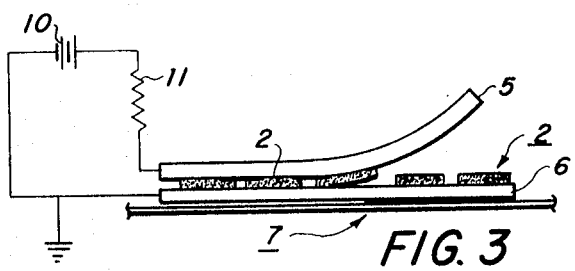
FIG. 3 is a side sectional view diagrammatically illustrating the separation of the manifold set in the process of this invention.

Referring now to FIG. 3, there is diagrammatically shown the step of separating the manifold set after exposure to electromagnetic radiation. In FIG. 3 donor sheet 5 is shown being separated from receiver sheet 6 which is residing upon the master 7. During the separation step, an electric field is being supplied from power source 10 through resistor 11. Portions of imaging layer 2, which were directly over image areas of master 7 are found to be adhering to receiver sheet 6 while portions of imaging layer 2 over nonimage areas of master 7 and thus exposed to electromagnetic radiation from both directions are retained on donor sheet 5. Thus, upon separation of the donor and receiver sheets, a positive corresponding to the image on master 7 is found on receiver sheet 6 while a negative of the master image is found on donor sheet 5. Depending upon the nature of the electrically photosensitive materials and the polarity of the electric field, the image sense can be varied from that illustrated by the attached drawings. In addition, the image sense obtained on the donor or receiver sheet can be modified by altering the electric field across the imaging layer as disclosed in copending application, Ser. No. 609,058 filed Jan. 13, 1967, now abandoned which is incorporated herein by reference.

The basic physical property desired in the imaging layer is that it be frangible or structurally weak as prepared or after having been suitably activated. That is, the layer must be sufficiently weak structurally so that the application of electrical field combined with the action of actinic radiation on the electrically photosensitive materials will fracture the imaging layer. Further, the layer must respond to the application of field the strength of which is below that field strength which will cause electrical breakdown or arcing across the imaging layer. Another term for "cohesively weak," therefore, would be "field fracturable."

As indicated in FIG. 3 above, imaging layer 2 transfers to the receiver sheet 6 in the areas corresponding to the image areas of master 7. This is due to the fact that imaging layer 2 is releasably residing on donor sheet 5. For ease of handling and storage of the donor sheets, it is a common practice to temporarily fix imaging layer 2 on donor sheet 5 and when ready to be employed in the imaging process of this invention the imaging layer is rendered releasable structurally weak. The process of rendering the imaging layer releasable from the donor sheet and structurally weak is termed activation. The activation step may take many forms, such as heating the imaging layer or applying a substance to the surface of the imaging layer or including a substance in the imaging layer which substance upon proper treatment renders the imaging layer releasable. The substance so employed is termed an activator. Preferably the activator should have a high resistivity so as to prevent electrical breakdown of the manifold set. Accordingly, it will be generally found to be desirable to purify commercial grades of activators so as to remove impurities which might impart a higher level of conductivity. This may be accomplished by running the fluids through a clay column or by employing any other suitable purification technique. Generally speaking the activator may consist of any suitable material having the aforementioned properties. For purposes of this specification and the appended claims, the term activator shall be understood to include not only materials which are conventionally termed solvents but also those which are partial solvents, swelling agents or softening agents for the imaging layer. The activator can be applied at any point in the process prior separation of the manifold sandwich.

It is generally preferable that the activator have a relatively low boiling point so that fixing of the resulting image can be accomplished upon evaporation of the activator. If desired, fixing of the image can be accomplished more quickly with mild heating or secondary transfer to another surface. It is to be understood, however, that the invention is not limited to the use of these relatively volatile activators. In fact, relatively nonvolatile activators including silicone oils such as dimethylpolysiloxanes and very high boiling point long chain aliphatic hydrocarbon oils ordinarily used as transformer oils such as Wemco-C transformer oil, available from Westinghouse Electric Co., have also been successfully utilized in the imaging process. Although these less volatile activators do not dry off by evaporation, image fixing can be accomplished contacting the final image with an absorbent sheet such as paper which absorbs the activator fluid. In short, any suitable volatile or nonvolatile activator may be employed. Typical activators include aromatic and aliphatic hydrocarbons such as benzene, toluene, xylene, hexane, cyclohexane, gasoline, mineral spirits and white mineral oil, decane, dodecane, deodorized kerosene, acetone, decane, petroleum ether, Freon 214 (tetrafluorotetrachloropropane), carbon tetrachloride, other halogenated hydrocarbons such as chloroform, methylene chloride, trichloroethylene, perchloroethylene, chlorobenzene, trichloromonofluoroethane, trichlorotrifluoroethane, ethers such as dioxane, tetrahydrofuran, ethyleneglycol monoethyl ether, vegetable oils such as coconut oil, babussu oil, and mixtures thereof. Sohio Odorless Solvent 3440, an aliphatic kerosene type hydrocarbon available from The Standard Oil Co., is preferred because it is odorless, nontoxic and has a relatively high flash point.

Figure 4:
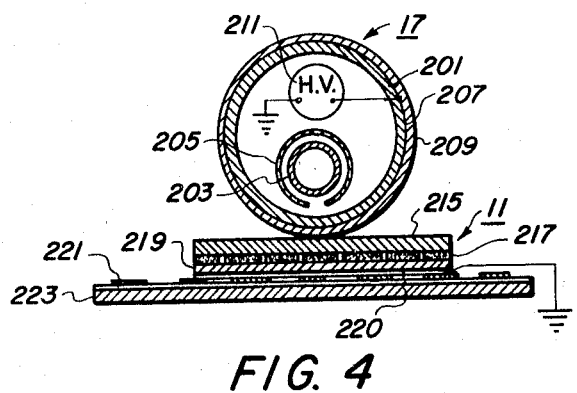
FIG. 4 is a side sectional view diagrammatically illustrating the preferred method of illuminating the master while subjecting the imaging layer to an electric field.

In a particularly preferred method of imaging in accordance with the process of this invention, a rolling optical system is employed, which performs the double function of subjecting the manifold set to an electric field while exposing the master to electromagnetic radiation. Basically, the rolling optical system is either held stationary while the manifold set is passed tangentally in contact therewith or the optical system is rolled across a stationary manifold set. Preferably, the rolling optical system is rotatably mounted in a fixed position while the manifold set is passed under the cylinder and in contact therewith. Referring now to FIG. 4, there is diagrammatically shown such a rolling optical system. In FIG. 4 there is generally shown cylinder 17 comprising transparent base 201 having disposed therein a tubular source of electromagnetic radiation such as a filament lamp or fluorescent bulb 203. In the preferred embodiment of this invention, a reflective shield 205 is provided around electromagnetic radiation source 203 to direct the radiation toward one segment of cylinder 201. Transparent cylinder 201 can comprise any suitable material which is transparent to the electromagnetic radiation employed. Thus, most commonly the transparent cylinder is glass and the electromagnetic radiation is in the visible light range. Other transparent materials can be employed keeping in mind the electromagnetic radiation employed. Plastic material such as polymethyl methacrylate sold under the trade names Plexiglass and Lucite by Rohm & Haas Co. and E. I. duPont de Nemours & Co., Inc. can be employed. On the circumference of transparent cylinder 201, there is coated a layer of electrically conductive material 207. The conductive coating can comprise any electrically conductive material which is transparent to the electromagnetic radiation employed. Thus, metals such as aluminum, gold, silver, copper, magnesium and other metals can be deposited on the cylinder in thin coatings to provide the conductive layer while allowing electromagnetic radiation to pass through. In a preferred embodiment of this invention, a tin oxide coated glass cylinder is employed.

The conductive coating 207 around the cylinder can be provided by either coating a thin conductive film directly on the outside of the cylinder or a conductive coating on a transparent film substrate can be employed as a covering over the cylinder with the conductive coating pressing against the outer surface of the cylinder. For example, a conductive coating such as aluminum coated on transparent flexible polyethylene terephthalate film can be wrapped tightly around a transparent cylinder to provide an insulated conductive coating on the cylinder.

The thickness of the conductive coating 207 can vary greatly. Normally the thickness of the conductive coating is in the range of from about 0.001 micron to about 0.1 micron. Of course, other thicknesses can be employed if suitable.

Conductive coating 207 is covered with an insulating film 209 which serves to provide an electrical barrier between the conductive coating and the materials which come in contact with the cylinder. Such insulating films are preferably high dielectric strength polymeric materials. Typical insulating materials include polyethylene, polyporpylene, polyester, polyethylene terephthalate, polystyrene, cellulose acetate and polystyrene. Other electrically insulating materials possessing the required transparency to electromagnetic radiation will occur to those skilled in the art. Mylar is preferred because of its durability and its excellent insulative qualities. Mylar having a transparent conductive evaporated metal coating on one side is particularly preferred because when wrapped around a glass cylinder it provides both the conductive and insulating coating around the cylinder.

In a particularly preferred embodiment of this invention, there is provided within the transparent cylinder 201 an electrical power supply 211 which can be employed to provide a high DC voltage to the conductive layer. This power supply can then be grounded through conventional concentric bearings on one end of the cylinder which ground can be placed in communication with a second electrode so as to provide an appropriate electric field depending upon the imaging system in which the apparatus is employed. Alternatively, an external power supply can be employed by providing an electrical connection between the conductive coating and a sliding or rolling contact placed within the concentric bearing of the cylinder.

Also shown in FIG. 4 is manifold set generally indicated as 11 comprising receiver sheet 215, imaging layer 217 and donor sheet 219. Donor sheet 219 is provided with a conductive backing 220. Conductive coating 220 can be any transparent coating such as cellophane or a vacuum deposited metal of a thickness so as to be at least about 80 percent transparent to the electromagnetic radiation employed. Below manifold set 11, there is placed an original master 221 in optical reflex contact with manifold sandwich 11. Alternatively, original document 221 can rest upon a base 223 which is connected to a common ground with power supply 221 providing an electric field across manifold set 11. By connecting the conductive surface 220 to a common ground with power supply 211, an electric field can be established across the manifold set without including the original document. This later arrangement is a preferred embodiment of this invention because the original document is not included within the electric field, thus eliminating a variable in the imaging process.

DESCRIPTION OF THE PREFERRED EMBODIMENTS

The following Examples further illustrate the present invention. The Examples below are intended to illustrate various preferred embodiments of the improved imaging method. The parts and percentages are by weight unless otherwise indicated.

EXAMPLE I

A donor to be employed in the manifold imaging process described above is first prepared by providing an electrically photosensitive imaging layer in a dot pattern on a substrate. A black layer is prepared by first providing the "$x$" form of phthalocyanine in accordance with the procedure of Example I of U.S. Pat. No. 3,357,989 which is incorporated therein by reference. About 37.5 grams of x-phthalocyanine, mixed with 42 grams of Irgazine red, available from Geigy Chemical Company, 18 grams of purified Algol Yellow, C. I. No. 67300 available from General Dyestuffs Co. and about 900 ml. of clay purified DC naphtha are placed in a jar and milled for four hours at 60 r.p.m. using ⅝ inch to ¾ inch diameter flint stones. A binder solution is also prepared by placing in a 600 ml. glass beaker about 45 grams of purified polyethylene DYLT available from Union Carbide Corp., about 1.5 grams purified polyethylene DYDT also available from Union Carbide Corp., about 22.5 grams of Paraflint RG, a low molecular weight paraffinic material available from the Moore & Munger Co., 7.5 grams of purified Elvax 420, a vinylacetate-ethylene copolymer available from E. I. duPont de Nemours Inc., about 37.5 grams of a modified polystyrene available as Piccotex 100 from Pennsylvania Industrial Chemical Company together with about 300 ml. of purified Sohio Odorless Solvent 3440 available from the Standard Oil Co. The mixture is heated on a hot plate with stirring until a water-clear solution is obtained. The beaker is removed from the hot plate and allowed to cool to room temperature forming a white paste. The cooled binder paste is added to the premilled pigment in the jar mill and milled together for about 16 hours. After milling, the mixture is heated to 65° C. for 2 hours and then cooled to room temperature. About 1,000 ml. of reagent grade isopropyl alcohol is added to the jar and the mixture is milled for an additional 20 minutes. The dispersion of electrically photosensitive material in the binder is then coated on a 3 mil Mylar sheet with a 165 cup/inch quadrigravure roller providing a 15 percent void area screen pattern having a coating weight of 0.27 grams/ft. on a solid coverage basis which is dried at 120° F. The coated Mylar is employed as a donor sheet in the manifold imaging process described above. The coated sheet with its coated side out is taped to a cylinder comprising a Pyrex glass tube around which is wrapped a ½-mil thick sheet of Mylar having coated on its surface in contact with the glass a thin transparent coating of aluminum. The donor is activated with Isopar E, a synthetic aliphatic hydrocarbon available from Humble Oil and Refining Co., to render it releasable and structurally fracturable in response to the combined effect of an applied electric field and exposure to electromagnetic radiation to which the layer is sensitive. While in the dark, the positive side of a 1,200 volt DC power supply with a negative ground is connected to the conductive coating around the cylinder. A tubular 4 watt fluorescent cool white light bulb surrounded by a light shield mounted in the cylinder is illuminated. The light shield contains a slit ⅛ inch wide along its length to provide for exposure of the donor while it is in contact with the receiver sheet. An original document is laid on a conductive movable table and covered with a 2-mil thick sheet of Mylar. The table is connected to the ground side of the power supply and is moved past the roller so as to bring the receiver sheet and the donor donor sheet into contact with each other and to pass the thus formed manifold sandwich beneath the exposure slit of the light shield within the cylinder. The table speed is 1.1 inches per second and the total light intensity (measured by means of a calibrated thermopile) is 380 microwatts per square centimeter per second. The light passes through the manifold sandwich onto the original and the light not absorbed by the original is reflected back onto the imaging layer. After passing by the exposure slit, the movement of the table separates the manifold set whereupon there is found a negative image on the donor sheet and a positive image on the receiver sheet. Either image can be projected as a transparency or bright image display.

EXAMPLE II

Example I is repeated with the exception that the light intensity is reduced to about 300 microwatts per square centimeter per second by reducing the voltage to the fluorescent bulb. The table is moved past the cylinder at a speed of 0.75 inches per second. As in Example I, a negative image is produced on the donor while a positive image is produced on the receiver sheet.

EXAMPLE III

The procedure of Example I is repeated except that the back of the receiver sheet is coated with a transparent conductive coating of aluminum which coating is connected to the ground side of the power supply so as to provide a field across the manifold sandwich but excluding the document to be copied. After exposure under an electric field, the manifold set is separated to provide a positive and a negative image of the original document as in Example I.

EXAMPLE IV

A commercial metal-free phthalocyanine is first purified by o-dichlorobenzene extraction to remove organic impurities. Since this extraction step yields the less sensitive beta crystalline form, the desired "$x$" form is in accordance with the procedure of Example I of U.S. Pat. No. 3,357,989. The "$x$" form phthalocyanine thus produced is used to prepare the imaging layer according to the following procedure: About 5 grams of the "$x$" form phthalocyanine is added to about 5 grams of Algol Yellow GC, 1,2,5,6-di(C,C'-diphenyl) thiazole-anthraquinone, C. I. No. 67300, available from General Dyestuffs, and about 2.8 grams of purified Watchung Red B, 1-(4'-methyl-5'-chloro-benzene-2'-sulfonic acid)-2-hydroxy-3-naphthoic acid, C. I. No. 15865, available from E. I. duPont de Nemours & Co., which is purified as follows: approximately 240 grams of the Watchung Red B is slurried in about 2,400 milliliters of Sohio Odorless Solvent 3440, a mixture of kerosene fractions available from the Standard Oil Company of Ohio. The slurry is then heated to a temperature of about 65° C. and held there for about one-half hours. The slurry is then filtered through a glass sintered filter. The solids are then reslurried with petroleum ether (90° to 120° C.) available from Matheson, Coleman and Bell Division of the Matheson Company, East Rutherford, New Jersey and filtered through a glass sintered filter. The solids are then dried in an oven at about 50° C.

About 8 grams of Sunoco Microcrystalline Wax Grade 5825 having an ASTM-D-127 melting point of 151° F. and about 2 grams of Paraflint R. G., a low molecular weight paraffinic material, available from the Moore & Munger Company, New York City, about 144 milliliters of petroleum ether (90° to 120° C.) and about 40 milliliters of Sohio Odorless Solvent 3440 are placed with the pigments in a glass jar containing one-half inch flint pebbles. The mixture is then milled by revolving the glass jar at about 70 r.p.m. for about 16 hours.

The mixture is then heated for approximately 2 hours at about 45° C. and allowed to cool to room temperature. The mixture is then ready for coating on the donor substrate. The pastelike mixture is then coated in subdued green light on 2 mil Mylar (a polyester formed by the condensation reaction between ethylene glycol and terephthalic acid available from E. I. du-Pont de Nemours & Co., Inc.) with a No. 36 wire wound drawdown rod to produce a coating thickness when dried of approximately 7½ microns. The coating and 2 mil Mylar sheet is then dried in the dark at a temperature of about 33° C. for one-half hour.

The imaging layer prepared as described above is activated with Sohio Odorless Solvent 3440 and the activated imaging layer is contacted with a 2 mil Mylar receiver. A screened imaging layer is prepared by placing a 32½ line screen (Zip-a-tone) adjacent the donor and the combined screen and manifold set is placed upon the tin oxide surface of a NESA glass electrode. A black paper electrode is placed over the receiver and connected to the negative terminal of an 8,500 volt DC power source and the NESA electrode is connected to the positive terminal. The imaging layer is exposed through the NESA and screen to white incandescent light for a total incident energy of 0.3 foot-candle seconds after which the receiver and donor are separated while under the field. A screen pattern results on the donor sheet. The donor is then recombined with a transparent polyethylene coated paper receiver which is wetted with Sohio Odorless Solvent 3440. The manifold set containing the screened imaging layer is placed donor side down on the NESA electrode and a document to be duplicated or as is referred to above a master is placed over the receiver with the NESA connected to a negative terminal of an 8,500 volt DC power supply and the black paper electrode placed over the master connected to the positive terminal of the power source. The imaging layer is again exposed through the NESA electrode to a white incandescent light for a total incident energy of 16.5 foot candle seconds. Upon separation of the manifold set while under the electric field, a negative image is observed on the donor sheet and a positive image of the original document or master is observed on the receiver sheet.

EXAMPLE V

The procedure of Example IV is repeated with the exception that subsequent to the exposure of the imaging layer with the master in place above the receiver, the polarity of the electric field is reversed. Upon separation of the manifold set under the influence of the reversed electric field, a positive image of the original is observed on the donor sheet and a negative image of the original is observed on the receiver sheet.

Although specific components and proportions have been stated in the above description of preferred embodiments of the invention, other typical materials as listed above, if suitable, may be used with similar results. In addition, other materials may be added to the components to synergize, enhance or otherwise modify their properties. For example, various dyes, spectral sensitizers or electrical sensitizers such as Lewis Acids may be added to the imaging layer.

Other modifications and ramifications of the present invention will occur to those skilled in the art upon a reading of the present disclosure. These are intended to be included within the scope of this invention.

What is claimed is:

1. A contact reflex imaging process comprising the steps of:
   a. providing a manifold set comprising an electrically photosensitive imaging layer in a screen pattern releasably residing on a donor sheet and in contact with a receiver sheet, said layer being structurally fracturable in response to the combined effect of an applied electric field and exposure to electromagnetic radiation to which said layer is sensitive and said donor and receiver sheets being at least partially transparent;
   b. contacting one side of said manifold set with a master to be duplicated;
   c. applying an electric field across said imaging layer;
   d. exposing said master to electromagnetic radiation to which said layer is sensitive through said manifold set; and
   e. separating said set while under said field.

2. The method of claim 1 wherein the imaging layer is rendered releasable by the application thereto of an activator.

3. The method of claim 1 wherein the master contacts the receiver side of the manifold set.

4. The process of claim 1 wherein the master contacts the donor side of the manifold set.

5. The method of claim 1 wherein the imaging layer comprises an electrically photosensitive imaging material dispersed in a binder.

6. The method of claim 5 wherein the electrically photosensitive material is an organic material.

7. The method of claim 6 wherein the organic material is metal-free phthalocyanine.

8. The method of claim 1 wherein the imaging layer covers from about 75 to about 95 percent of the surface area of said donor sheet.

9. The method of claim 1 wherein the electric field is in the range from about 2,000 volts to about 7,000 volts per mil.

10. The method of claim 1 wherein the electromagnetic radiation is in the visible light range.

11. A contact reflex imaging process comprising the steps of:
    a. providing a manifold set comprising an electrically photosensitive imaging layer in a dot pattern releasably residing on a donor sheet and in contact with a receiver sheet, said donor and receiver sheets being at least partially transparent to electromagnetic radiation to which said imaging layer is sensitive;
    b. contacting one side of said manifold set with a master to be duplicated;
    c. applying an electric field across said imaging layer;
    d. exposing said master to electromagnetic radiation to which said layer is sensitive through said manifold set; and
    e. separating said set while under said field.

* * * * *